March 29, 1932. J. D. REARDAN 1,851,129
LAUNCHING APPARATUS
Filed March 12, 1930 3 Sheets-Sheet 1
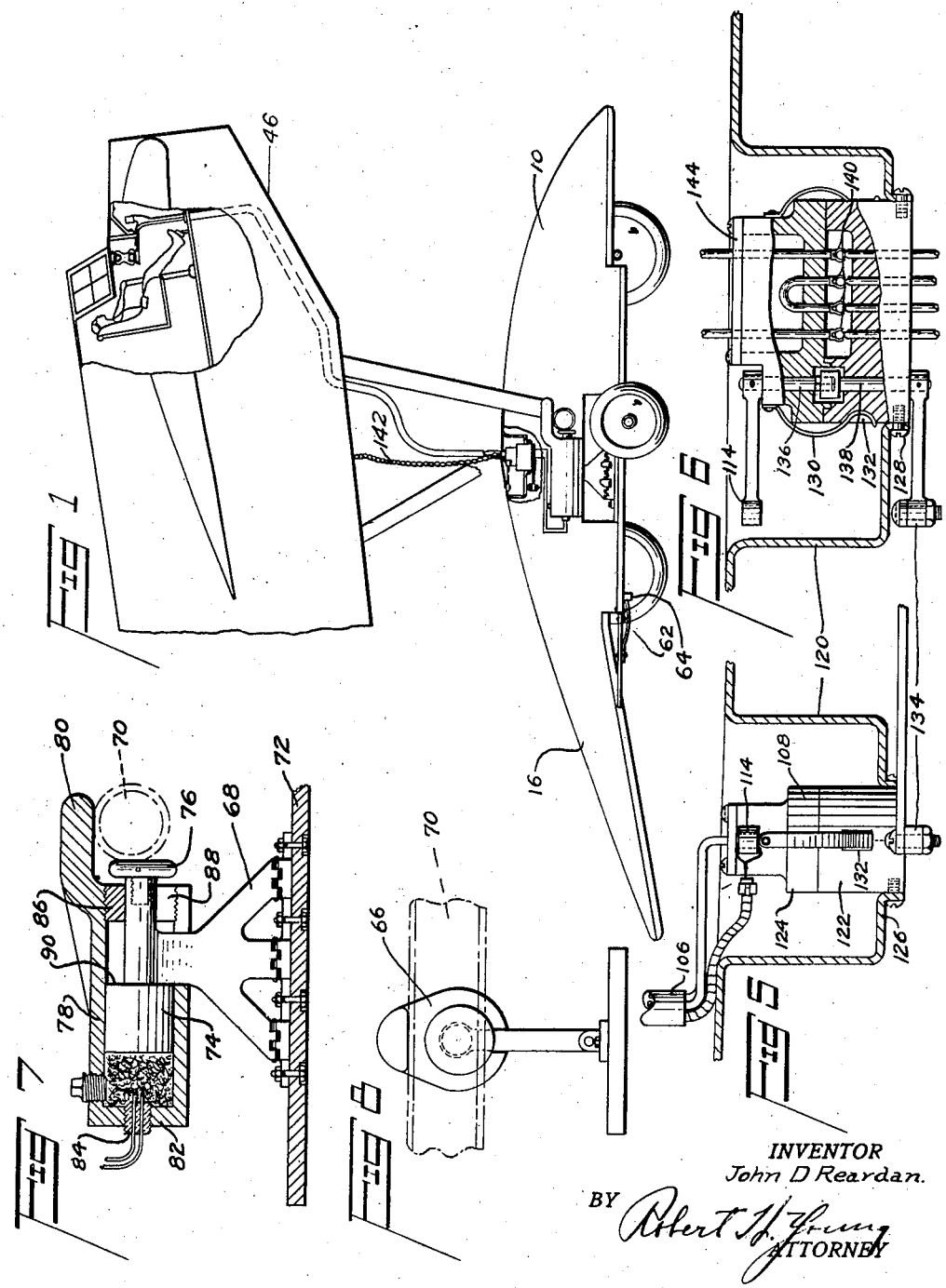
INVENTOR
John D Reardan.
BY
ATTORNEY

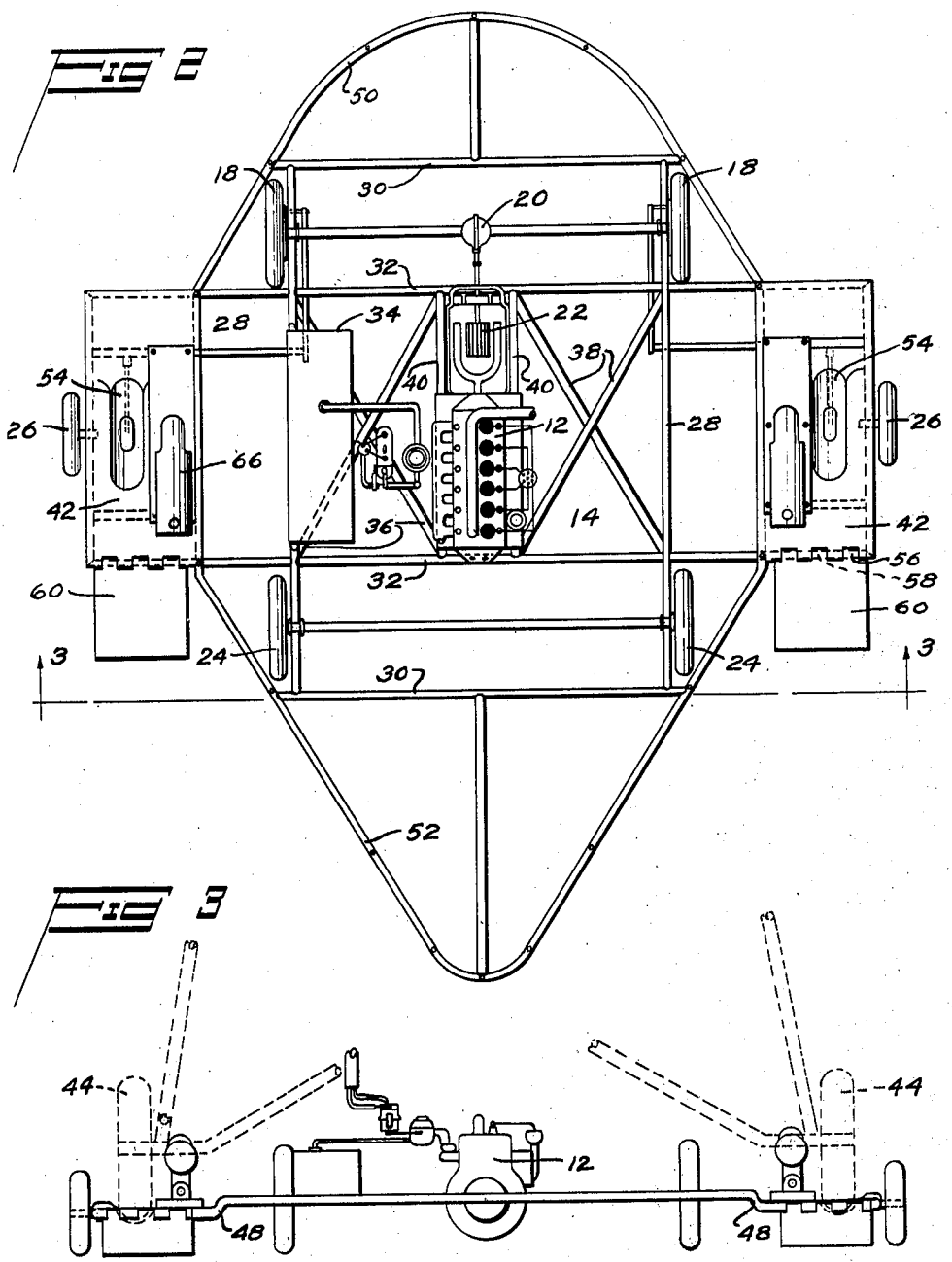

March 29, 1932.  J. D. REARDAN  1,851,129
LAUNCHING APPARATUS
Filed March 12, 1930   3 Sheets-Sheet 3
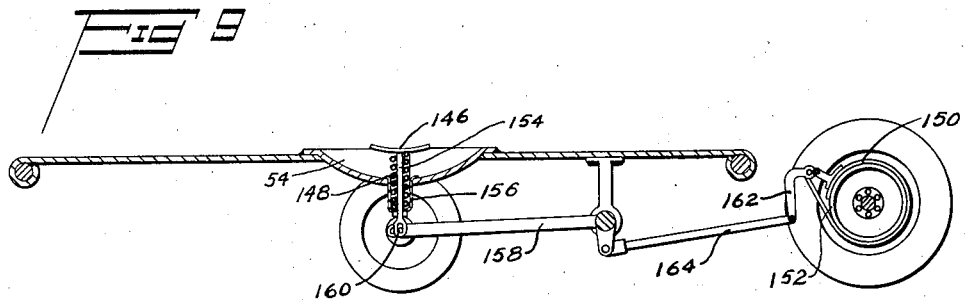
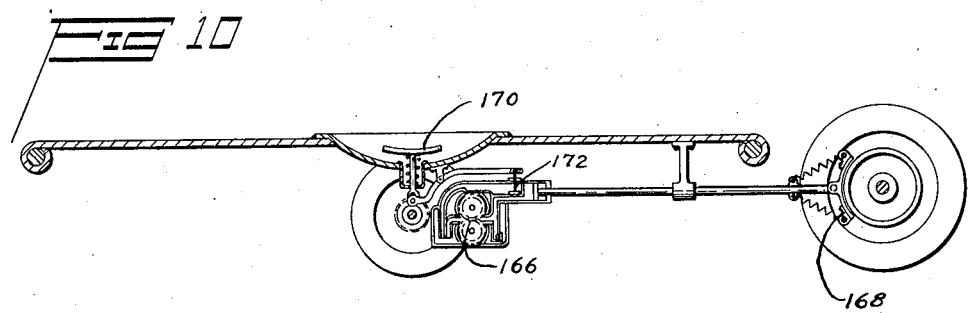
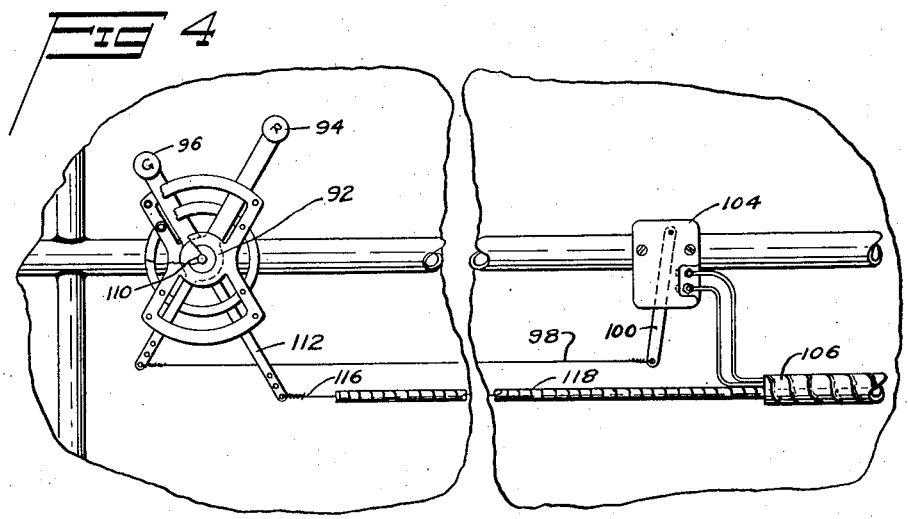
INVENTOR
John D Reardan
BY Robert H. Young
ATTORNEY Patented Mar. 29, 1932

1,851,129

UNITED STATES PATENT OFFICE

JOHN DELBERT REARDAN, OF DAYTON, OHIO

LAUNCHING APPARATUS

Application filed March 12, 1930. Serial No. 435,242.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to devices for launching flying machines, and more particularly to self-propelled launching devices which serve as a sustaining medium for the airplane in taking off from a landing field, deck of a ship or the like.

One of the primary objects of the invention is to provide an undercarriage that is adapted to securely support an aircraft and is provided with apparatus for being propelled independent of, but in consonance with, the aircraft thereby assisting in overcoming the initial drag and inertia; to release the aircraft when a desired speed is attained; and to retard its movement upon the separation of the aircraft therefrom.

Another object of this invention is to provide an undercarriage of this character which is semi-automatic in its action; to wit, it is dependent for its propulsion and speed control, while sustaining the aircraft, upon the pilot of the aircraft, and is automatic in its action upon separation of the aircraft therefrom.

A further object of my invention is to provide an undercarriage with means to permit an airplane to mount the same by the use of power from the plane.

Other objects and advantages of the invention will be apparent from the description set out below, when taken in connection with the accompanying drawings.

It is well known that it is necessary to impart to a flying machine a high speed along the ground before the machine will take to the air. Due to the head resistance and inertia being large with respect to the airplane's normal power, a high speed is not obtained until after a long stretch of travel along the ground. It is also well known that more power is required to cause an airplane to climb than to maintain the same in level flight. By the use of my device in which a generous amount of external power is used during the period of launching, the length of run will be decreased and the time of take-off and initial rate of climb will be improved.

It will also be apparent that by the use of my device, the excess power normally required to lift the airplane can be dispensed with, with a consequent reduction in weight, thereby further reducing the initial drag and inertia.

Figure 1 is a side elevational view showing an airplane mounted upon the carriage with parts broken and removed to show up some of the otherwise hidden parts.

Figure 2 is a top plan view of the carriage with the cowling removed.

Figure 3 is a sectional end view taken on the lines 3—3 with parts of the airplane landing gear shown in phantom.

Figure 4 is an enlarged detailed view of the remote control supported in the cockpit.

Figures 5 and 6 detail enlarged and outside views respectively of the separable plug attached to the cowling and showing parts broken away.

Figure 7 is a longitudinal sectional view of the release mechanism.

Figure 8 is an end view of Fig. 7 looking from right to left.

Figure 9 is a sectional detailed view showing the braking mechanism for retarding the movement of the carriage upon release of the airplane, and Figure 10 is a modified form of braking mechanism.

Like reference characters refer to like parts in the several figures of the drawings.

In the construction illustrated the airplane launching apparatus or carriage 10 includes a running gear that is actuated by means of a power plant 12, a chassis frame 14 having suitable bracings to support the power plant and a deck or cowling 16 mounted on the chassis frame.

The chassis frame 14, as best shown in Fig. 2, is supported on six wheels which are arranged in pairs. The front pair of wheels 18 constitute the driving wheels and are connected to the motor through a differential 20 and a suitable electro-magnetic transmission 22, such as the Owen magnetic type, which in this figure is shown diagrammatically. The rear wheels 24 are positioned at the rear of the chassis and are arranged in tandem relation with the front wheels, and intermediate of the front and rear wheels is disposed a pair of side wheels 26, each side wheel being laterally spaced from the front and rear wheels and providing therewith a three-point support for each side of the chassis frame.

The chassis frame in accordance with the design disclosed in Figs. 2 and 3, is constructed from steel tubes which are welded at their joints to provide a relatively rigid structure and comprises a pair of side frame members 28 that are secured together at their ends by cross members 30, and a pair of spaced cross members 32 disposed intermediate of the end members 30, and bracing members interconnecting and disposed between the intermediate portions of the side members 28 and cross members 32. These bracing members cooperate with the side members and cross members to provide a support for the gasoline tank 24, the power plant, and other accessories, and consist of two sets of strut members 36 and 38 that are diagonally and oppositely arranged on opposite sides of a pair of longitudinal members 40. The cross members 32 have their ends which serve to support the landing gear platform 42, extending a substantial distance beyond the side members. The extent of the distance will depend of course upon the distance between the landing gear runners of the airplane 46. The ends of each cross member are provided with a stepped portion 48 in order to have the position of the platform relatively low, thereby facilitating the mounting of the airplane upon the carriage. The chassis frame is also provided with front and rear supporting frames 50 and 52 respectively, together with which the chassis frame provides a support for and presents a peripheral conformation substantially the same as the cowling 16. The rear end frame is tapered downwardly and rearwardly to correspond with the rear end of the cowling which serves as a guide to prevent the hooking of the airplane tail skid (not shown) to the chassis.

When it is desired to mount the airplane upon the carriage, the runways 60 are dropped from their normal horizontal position to a position as shown in Fig. 3, over which runways the wheels of the airplane travel and are received within the wells 54. To maintain the runways in a horizontal position a spring arm 62 is attached at one end to the bottom face of the runway, the other end being free to ride over a block 64 when said arm is sprung from its locked position against the block to lower the runway. The airplane, of course, may be towed or moved by its own power onto the platform and is held fast thereto by means of a pair of releasing devices 66 Figs. 1 and 7, each of which is hingedly connected to a support 68 which is bolted to the platform and disposed adjacent to and parallel with the well to swing laterally inwardly, thus avoiding interference with the landing gear wheel axle 70 when the airplane is being mounted onto the carriage.

The release device 66 comprises a support 68 hingedly connected as previously described to the base plate 72, a piston 74 rigidly fixed on one side of the upper end device 78, in the form of a cylinder, slidably mounted on the piston to move relative to the support. The locking device is provided with a projection 80 which is adapted to be moved over the axle, thereby retaining the wheel in the well 54 and locking the airplane to the carriage.

It is quite desirable that the releasing of the airplane be substantially instantaneous and to this end electrical means and explosive means is made use of in actuating the locking device to its released position. The Tascker type of self-cocking percussion firing is considered to be quite suitable for this purpose and is adapted to this release mechanism by tapping the closed end or head 82 of the cylinder to receive an electrical spark producing member 84 and filling the space between cylinder head and piston with an explosive material, that is readily ignitible by a spark such as gun powder. To permit the locking member 78 to be moved and guided relative to the support, one end of the cylinder wall as well as a plug 86, threaded therein, is slotted to provide a guideway 88 the length of which determines the extent of movement of the projection or retaining member 80 over the axle, whereas the plug 86 which serves to stop the rearward movement of the locking element by abutting the piston face 90, is spaced therefrom a distance to provide a clearance between the end of the projection and the axle 70, thus permitting the release mechanism to be swung from its inoperative position to operative position and vice versa as shown in dotted lines in Fig. 3 without interposing therewith. It will thus be seen that immediate releasing of the airplane from the carriage can readily be effected when desired. The time when to release the airplane from the carriage should be a matter entirely within the discretion of the pilot and therefore it is desirable to place a remote control for firing the explosive mixture in the cylinder in the cockpit of the airplane. It is an important and novel feature of this invention to have the power actuating means of the carriage also under the control of the pilot in order that the speed of the airplane and the speed of the carriage can be kept in consonance during the take-off. Any remote control that will actuate the throttle and which is readily provided with detachable means for disconnecting the same from the carriage upon the release of the airplane, is suitable for this purpose. It is found expedient to have both the throttle remote control and spark control in the same unit in order that the completion of the spark circuit and the shutting of the carriage engine throttle may be effected at substantially the same instant. The closing of throttle at the time of release, while not necessary, is believed to be beneficial since it will result in a slowing down of the carriage engine and consequently the carriage, and will also effect a saving of fuel. This control unit 92 which is provided with two levers 94 and 96 is affixed to a longitudinal member in the cockpit and within reach of the pilot. The release control lever 94 is connected by means of a wire cable 98 to a switch arm 100 for making an electric circuit to produce a spark and fire the explosive material when the upper arm or handle of the pivoted lever 94 is moved toward the pilot, and for breaking the circuit when moved in the opposite direction. The circuit comprises a pair of conduits 102 which lead from a battery (not shown) in the airplane to a suitable switch box 104, through a flexible housing 106 into a readily separable plug 108 and thence to the firing plug 84.

The remote control throttle lever 96 is pivotally mounted on the same shaft 110 as the lever 94 and is manually moved by means of its handle in the same direction for closing the throttle as the lever 94 is moved for making the circuit. The lower arm 112 of the lever 96 has attached thereto one end of a control cable, the other end of which is connected to a throttle control crank 114. The fur control cable which is also disposed within the housing 106 consists of a control wire 116, a flexible tubing 118, through which the control wire passes. The detachable means above referred to, is constructed in the form of a separable plug that is moulded out of two parts.

As shown in Figs. 5 and 6 and in accordance with the present design a separable plug 108 adapted to include several sets of separable means whereby the remote control for the release mechanism and the carburetor as well as the power plant ignition circuit is rendered inoperative when the airplane is released from the carriage. This separable plug, which is disposed within a well 120 made integral with the cowling, comprises two separable members 122 and 124 that are formed from any suitable insulating material such as phenolphthaline.

The lower member 122 is disposed within an opening formed in the bottom wall 126 of the well 120 and is secured thereto by any suitable means such as the threaded member 128. The upper member 124 is yieldingly retained in position on the lower member by means of a pair of snap spring elements 130 that are positioned on each side of the plug. Each spring element has one end fixed to the upper member, the other end being coiled and adapted to snap into a recess 132 formed on each side of the lower member, thus compressively locking the two members together. The separable means for the release control comprises a pair of cranks 114 and 134 carried by the upper and lower members 124 and 122 respectively. The arm 136 of the crank 114 is provided with square shaped end which is received within a complementary socket formed on the arm 138 of the crank 134. Both the release circuit and the power plant ignition circuit are adapted to be readily broken by terminating the leads of each circuit in each member and connecting the respective leads of each circuit by means of snap fasteners 140. In order to insure the separation of the plug members as well as to prevent possible breaking of the control cable or leads extending from the upper member to the cockpit, a slightly loose chain 142 may be connected at one end to the bottom of the fuselage and at its other end to a cover plate 144 secured to the upper plug member. It will thus be seen that when the airplane is released and the slack in the chain is taken up, the upper plug is carried therewith thereby breaking the several connections heretofore described.

Upon releasing the airplane from the carriage, all control thereof is lost and it is therefore desirable to bring the same to a stop as soon as possible. In addition to the braking action tending to retard the forward movement of the carriage at the time, affected by the Owen magnetic transmission, a further means for automatically retarding the forward movement of the carriage is provided. Any suitable brake mechanism may be provided to accomplish this purpose and as shown in Fig. 9 comprises a brake pedal 146 adapted to be yieldingly pressed downwardly against a coil spring 148 by the landing gear runner 44 when mounted on the carriage to withhold the brake band 150 from the wheel brake drum 152. The coil spring 148 is situated on the rod 154 of the brake pedal 146 and is seated in cup 156 formed at the bottom of the well 54. The rod 154 and the bell crank arm 158 are slotted at their adjacent ends and connected by means of a pin 160 to provide a lost motion connection to take care of any possible slight up and down movements of the runner to prevent applying the brake. When the airplane runner leaves the well pressure is automatically exerted by means of the coil spring against the bottom face of the brake pedal, which pressure is transmitted by means of the lever 162 and rod 164 to tighten the brake band about the brake drum. It will of course be apparent from an inspection of Fig. 1 that there are two brakes, one on each side of the carriage, operating in connection with each of the front wheels.

A further type of braking mechanism for automatically retarding the forward movement of the carriage is shown in Fig. 10. This braking mechanism is similar to the disclosure on the Mayback Patent No. 1,743,367 granted January 14, 1930, and includes a hydraulic servo motor 166 that is driven from the intermediate wheel 26 by means of gearing (not shown) disposed between said pump and wheel. This servo motor is adapted to apply the braking pressure to the brake block 168 and is controlled by means of a brake pedal 170 through a valve 172 to automatically apply the brake in a manner described above. A detailed description of the brake mechanism is not believed necessary as the brake mechanism per se does not form a part of my invention.

Having thus described my invention, what I claim as new and desire to secure by Letters Patent of the United States is:—

1. A launching apparatus adapted for aircraft provided with landing gear comprising a chassis frame having a running gear, power means operatively connected to said running gear, an aircraft landing gear support fixed to said chassis and having pockets adapted to receive the runners of said aircraft landing gear and means cooperating with said pockets to releasably connect the landing gear of the aircraft to said apparatus.

2. A launching apparatus for an airplane comprising a chassis frame having a running gear and brakes carried thereby and normally in braking position, power means supported by said chassis and adapted to actuate said running gear, means for releasably connecting said airplane to said chassis, and brake control means operated by pressure of said airplane for releasing said brakes and automatically actuated upon release of said airplane to return said brakes to braking position.

3. A launching apparatus for an airplane comprising a chassis frame having a running gear, power means supported by said chasses and adapted to actuate said running gear, wheel brake mechanism for retarding the movement of said apparatus, a support fixed to said frame and having pockets to receive the wheels of said airplane and brake control means disposed within said pockets, said control means being actuated by said wheels to release the brake mechanism when said airplane is carried by said apparatus and being automatically actuated to put on the brakes when the airplane is released therefrom.

4. A launching apparatus adapted for aircraft provided with landing gear, comprising a chassis frame having a running gear, power means operatively connected to said running gear, an aircraft landing gear support fixed to said chassis and having pockets adapted to receive the runners of said aircraft landing gear, and a releasing device adjacent each pocket for receiving said landing gear axle and cooperating with said pocket for maintaining said runners therein.

5. A launching apparatus adapted for aircraft provided with landing gear, comprising a chassis frame having a running gear, power means operatively connected to said running gear, an aircraft landing gear support fixed to said chassis and having pockets adapted to receive the runners of said aircraft landing gear, and a releasing device mounted on said support for the aircraft and cooperating with said pockets to releasably connect the landing gear to said support, said device including a pivoted support for movement into operative or inoperative position and a locking element movable thereon.

In testimony whereof I affix my signature.

JOHN DELBERT REARDAN.